United States Patent
Wang et al.

(10) Patent No.: US 12,193,130 B2
(45) Date of Patent: Jan. 7, 2025

(54) HEATING DEVICE

(71) Applicant: HAIER SMART HOME CO., LTD., Shandong (CN)

(72) Inventors: Haijuan Wang, Qingdao (CN); Peng Li, Qingdao (CN)

(73) Assignee: HAIER SMART HOME CO., LTD., Shandong (CN)

( * ) Notice: Subject to any disclaimer, the term of this patent is extended or adjusted under 35 U.S.C. 154(b) by 805 days.

(21) Appl. No.: 17/420,445

(22) PCT Filed: Jan. 3, 2020

(86) PCT No.: PCT/CN2020/070343
§ 371 (c)(1),
(2) Date: Jul. 2, 2021

(87) PCT Pub. No.: WO2020/140989
PCT Pub. Date: Jul. 9, 2020

(65) Prior Publication Data
US 2022/0086963 A1    Mar. 17, 2022

(30) Foreign Application Priority Data
Jan. 4, 2019  (CN) .......................... 201910009511.2

(51) Int. Cl.
*H05B 6/12*     (2006.01)
*A23L 3/365*    (2006.01)
*H05B 6/72*     (2006.01)

(52) U.S. Cl.
CPC ................ *H05B 6/12* (2013.01); *A23L 3/365* (2013.01); *H05B 6/72* (2013.01)

(58) Field of Classification Search
CPC .............. H05B 6/72; H05B 6/12; A23L 3/365
(Continued)

(56) References Cited

U.S. PATENT DOCUMENTS

| 2,937,259 A | * | 5/1960 | Bell, Jr. | ................... | H05B 6/72 |
| | | | | | 343/731 |
| 3,366,769 A | * | 1/1968 | Lima | ....................... | H05B 6/70 |
| | | | | | 219/751 |

(Continued)

FOREIGN PATENT DOCUMENTS

| CN | 1523294 A | 8/2004 |
| CN | 1237308 C | 1/2006 |

(Continued)

OTHER PUBLICATIONS

International Search Report for PCT/CN2020/070343 (ISA/CN) mailed Mar. 27, 2020 (6 pages).

(Continued)

*Primary Examiner* — Jimmy Chou
(74) *Attorney, Agent, or Firm* — ALSTON & BIRD LLP

(57) ABSTRACT

Provided is a heating device. The heating device includes a cylinder body, a door body, an electromagnetic generating module and a radiating antenna. A heating chamber having a pick-and-place opening is defined in the cylinder body, and the heating chamber is configured to place an object to be processed. The door body is disposed at the pick-and-place opening and configured to open and close the pick-and-place opening. The electromagnetic generating module is configured to generate an electromagnetic wave signal. The radiating antenna is disposed in the cylinder body and electrically connected with the electromagnetic generating module to generate electromagnetic waves of a corresponding frequency according to the electromagnetic wave signal. The radiating antenna is configured to arch in a direction close to the object to be processed so as to eliminate the influence of an edge effect on the distribution uniformity of the electromagnetic waves in the heating chamber, and increase the energy density and distribution range of the electromagnetic (Continued)

waves while solving the problem of the production cost and improving the distribution uniformity of the electromagnetic waves.

10 Claims, 10 Drawing Sheets

(58) Field of Classification Search
USPC .......................................................... 219/620
See application file for complete search history.

(56) References Cited

U.S. PATENT DOCUMENTS

| | | | | |
|---|---|---|---|---|
| 3,493,709 A * | 2/1970 | Beggs | ...................... | H05B 6/72 |
| | | | | 219/748 |
| 3,549,849 A * | 12/1970 | Boehm | ................ | H05B 6/6482 |
| | | | | 219/685 |
| 3,798,404 A * | 3/1974 | Simon | .................. | H05B 6/6482 |
| | | | | 219/751 |
| 4,006,339 A * | 2/1977 | Maurer | .................. | H05B 6/705 |
| | | | | 219/693 |
| 4,568,811 A | 2/1986 | Yoshimura et al. | | |
| 4,580,023 A * | 4/1986 | Simpson | ................... | H05B 6/72 |
| | | | | 343/756 |
| 5,438,183 A * | 8/1995 | Hayami | .................... | H05B 6/72 |
| | | | | 219/746 |
| 5,558,800 A * | 9/1996 | Page | ........................ | H05B 6/72 |
| | | | | 331/110 |
| 6,118,112 A * | 9/2000 | Osepchuk | ................ | H05B 6/72 |
| | | | | 219/749 |
| 6,191,402 B1 * | 2/2001 | Ekemar | .................. | H05B 6/705 |
| | | | | 219/696 |
| 8,987,644 B2 | 3/2015 | Mori et al. | | |
| 2004/0206755 A1 * | 10/2004 | Hadinger | ............... | H05B 6/705 |
| | | | | 219/697 |
| 2009/0057302 A1 * | 3/2009 | Ben-Shmuel | ........ | H05B 6/6447 |
| | | | | 219/748 |
| 2009/0236335 A1 * | 9/2009 | Ben-Shmuel | ...... | B65D 81/3453 |
| | | | | 219/710 |
| 2010/0115785 A1 * | 5/2010 | Ben-Shmuel | ............ | H05B 6/72 |
| | | | | 34/260 |
| 2013/0175262 A1 * | 7/2013 | Gharpurey | ............... | H05B 6/72 |
| | | | | 219/745 |
| 2014/0063676 A1 * | 3/2014 | Sigalov | .................. | H05B 6/645 |
| | | | | 361/143 |

FOREIGN PATENT DOCUMENTS

| | | | | |
|---|---|---|---|---|
| CN | 101473693 A | 7/2009 | | |
| CN | 102525249 A | 7/2012 | | |
| CN | 102644946 A | 8/2012 | | |
| CN | 210629896 U | 5/2020 | | |
| DE | 102016119286 A1 * | 4/2018 | ............ | H05B 6/642 |
| EP | 2348257 A1 | 7/2011 | | |
| EP | 3240366 A1 | 11/2017 | | |
| JP | 0738711 U | 7/1995 | | |
| JP | 2000048950 A | 2/2000 | | |
| JP | 2006-286443 A | 10/2006 | | |
| JP | 2010-199009 A | 9/2010 | | |
| JP | 2013-222672 A | 10/2013 | | |
| RU | 2182689 C1 | 5/2002 | | |
| WO | WO-2014041430 A2 * | 3/2014 | ............... | H01Q 1/36 |

OTHER PUBLICATIONS

1st Office Action for Australia Application No. 2020205145 dated May 23, 2022 (3 pages).
1ST Office Action for EP Application No. 20736226.0 dated Feb. 15, 2022 (8 pages).
2nd Office Action for EP Application No. 20736226.0 dated Jun. 29, 2022 (5 pages).
1st Office Action for Russia Application No. 2021122554 dated Feb. 18, 2022 (7 pages).
Supplementary European Search Report for EP Application No. 20736226 dated Feb. 3, 2022 (4 pages).
Search Report for Russian Application No. 2021122554 dated Feb. 18, 2022 (4 pages).
Decision to Grant for Russia Patent Application No. 2021122554 dated Jun. 7, 2022 w/English translation (16 pages).
Notice of Acceptance for Australia Patent Application No. 2020205145 dated Feb. 2, 2023 (3 pages).
2nd Examination Report for Australia Patent Application No. 2020205145 dated Sep. 28, 2022 (3 pages).
3rd Office Action for EP Patent Application No. 20736226.0 dated Nov. 21, 2022 (5 pages).
1st Examination Report for India Patent Application No. 202137032088 dated Apr. 27, 2023 (7 pages).
Notice of Intention to Grant for European Patent Application No. 20736226.0 dated May 4, 2023 (38 pages).
1st China Office Action for China Patent Application No. 2019100095112 dated May 17, 2024 w/English translation (13 pages).

* cited by examiner

HEATING DEVICE

CROSS-REFERENCE TO RELATED APPLICATIONS

The present application is a national phase entry of International Application No. PCT/CN2020/070343, filed Jan. 3, 2020, which claims priority to Chinese Patent Application No. 201910009511.2, filed Jan. 4, 2019, which are incorporated herein by reference in their entirety.

TECHNICAL FIELD

The present invention relates to kitchen appliances, and particularly relates to an electromagnetic wave heating device.

BACKGROUND ART

In the freezing process of food, the quality of the food is maintained, but the frozen food needs to be thawed before processing or eating. In order to facilitate users freezing and thawing the food, in the prior art, the food is generally thawed by an electromagnetic wave device.

The temperature uniformity of the thawed food is closely related to the distribution uniformity of electromagnetic waves in a heating chamber. When there is a gap between a radiating antenna and the inner walls of the heating chamber in the circumferential direction of the radiating antenna, the electromagnetic waves in the heating chamber will be concentrated at the peripheral edge of the radiating antenna due to the edge effect of the radiating antenna. In the prior art, in order to solve this problem, the radiating antenna is configured to at least cover one inner wall of the heating chamber, so that the food is thawed uniformly. However, this solution not only has high production cost, but also cannot solve the problem that electromagnetic waves are concentrated at the peripheral edge of the antenna to cause local heating or even ignition of the antenna.

By comprehensive consideration, an electromagnetic wave heating device with low production cost and uniform distribution of electromagnetic waves is required in design.

SUMMARY OF THE INVENTION

One objective of the present invention is to provide an electromagnetic wave heating device with low production cost and uniform distribution of electromagnetic waves.

Specifically, the present invention provides a heating device, including:
a container body, in which a heating chamber having a pick-and-place opening is defined, and the heating chamber is configured to place an object to be processed;
a door body, disposed at the pick-and-place opening and configured to open and close the pick-and-place opening;
an electromagnetic generating module, configured to generate an electromagnetic wave signal; and
a radiating antenna, disposed in the container body and electrically connected with the electromagnetic generating module to generate electromagnetic waves of a corresponding frequency according to the electromagnetic wave signal, wherein
the radiating antenna is configured to arch in a direction close to the object to be processed, so as to make a distribution of the electromagnetic waves in the heating chamber more uniform.

Optionally, the radiating antenna includes:
a central part and an edge part, wherein the edge part is disposed on one side of the central part away from the object to be processed and extends parallel to the central part; and
a connecting part, configured to connect the central part and the edge part.

Optionally, the connecting part is configured to extend divergently from a peripheral edge of the central part to an inner peripheral edge of the edge part.

Optionally, the connecting part includes:
a first arc segment, configured to extend from the peripheral edge of the central part to a direction close to the edge part and to be tangent to the central part;
a straight-line segment, configured to be tangent to the first arc segment; and
a second arc segment, configured to connect an outer peripheral edge of the straight-line segment and the inner peripheral edge of the edge part and to be tangent to the straight-line segment and the edge part.

Optionally, geometric centers of the central part, the connecting part and the edge part all coincide with a center of a maximum cross section of the heating chamber taken along an imaginary plane parallel to the central part.

Optionally, the central part is in a shape of an oblong; and
a length direction of the central part is parallel to a length direction of the cross section.

Optionally, a length of the central part is 0.386 to 0.522 times a length of the cross section; and/or
a width of the central part is 0.19 to 0.471 times a width of the cross section; and/or
a fillet radius of the central part is 0.2 to 0.4 times the width of the central part; and/or
a length of an outer end edge of the edge part is 0.519 to 0.674 times the length of the cross section; and/or
a width of the outer end edge of the edge part is 0.38 to 0.62 times the width of the cross section; and/or
a fillet radius of the outer end edge of the edge part is 0.2 to 0.4 times the width of the outer end edge of the edge part; and/or
a radius of the first arc segment is greater than or equal to ⅓ of a spacing between the central part and the edge part in a direction perpendicular to the central part;
an included angle between the straight-line segment and the central part is 120° to 160°; and
a radius of the second arc segment is greater than or equal to ⅙ of a spacing between the central part and the edge part in a direction perpendicular to the central part.

Optionally, the central part extends horizontally;
the central part is disposed at a height of 0.285 to 0.5 of the container body; and
the edge part is disposed at a height of 0.19 to 0.334 of the container body.

Optionally, the heating device further includes:
an antenna housing, made of an insulating material and configured to separate an inner space of the container body into an electrical appliance chamber and the heating chamber, wherein
the radiating antenna is disposed in the electrical appliance chamber, and the central part thereof is fixedly connected with the antenna housing.

Optionally, the central part is provided with a plurality of engaging holes; and
the antenna housing is correspondingly provided with a plurality of buckles, and the plurality of buckles are configured to respectively pass through the plurality of engaging holes to be engaged with the central part, wherein each of the buckles is composed of a fixing part perpendicular to the central part and having a hollow middle part, and an elastic part extending inclining to the fixing part from an inner end edge of the fixing part and toward the central part.

The present invention creatively disposes the radiating antenna to arch in a direction close to the object to be processed, which can relatively reduce the distance between the center of the radiating antenna and a receiving pole and increase the distance between the peripheral edge of the radiating antenna and the receiving pole, thereby eliminating the influence of an edge effect on the distribution uniformity of the electromagnetic waves in the heating chamber, and increasing the energy density and distribution range of the electromagnetic waves while solving the problem of the production cost and improving the distribution uniformity of the electromagnetic waves.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
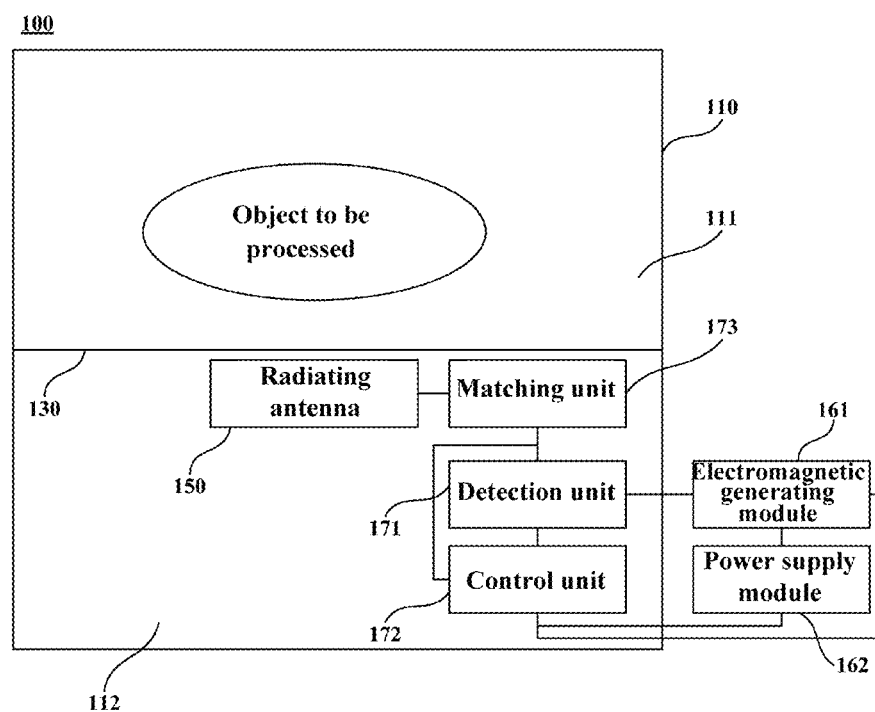
FIG. 1 is a schematic structural view of a heating device according to one embodiment of the present invention.
Figure 2:
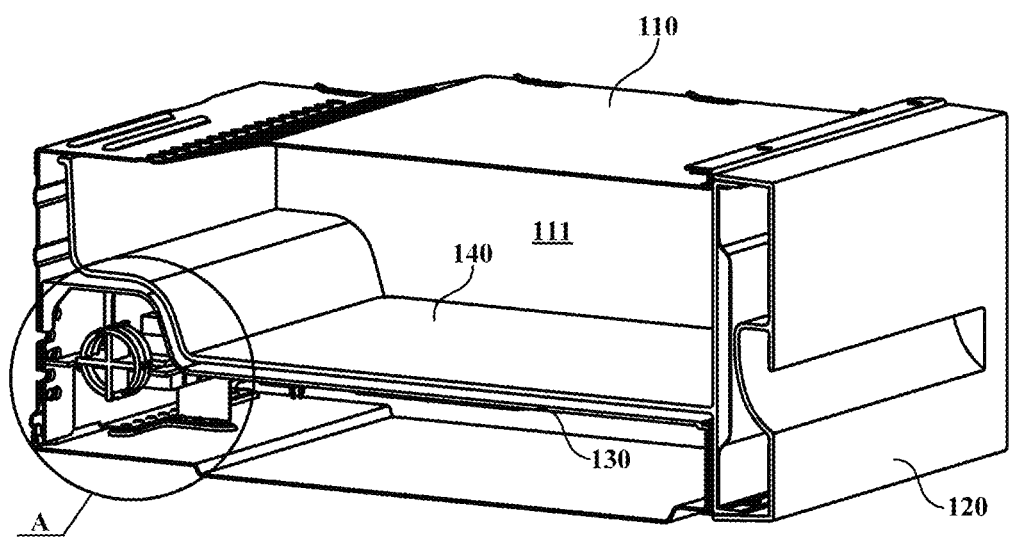
FIG. 2 is a schematic cross-sectional view of the heating device as shown in FIG. 1, wherein an electromagnetic generating module and a power supply module are omitted.

FIG. 1 is a schematic structural view of a heating device 100 according to one embodiment of the present invention. FIG. 2 is a schematic cross-sectional view of the heating device 100 as shown in FIG. 1, wherein an electromagnetic generating module 161 and a power supply module 162 are omitted. Referring to FIG. 1 and FIG. 2, the heating device 100 may include a container body 110, a door body 120, an electromagnetic generating module 161, a power supply module 162 and a radiating antenna 150.

A heating chamber 111 having a pick-and-place opening is defined in the container body 110, and the heating chamber 111 is configured to place an object to be processed. The pick-and-place opening may be formed in the front wall or the top wall of the heating chamber 111 so as to pick and place the object to be processed.

The door body 120 may be installed together with the container body 110 by an appropriate method, such as a sliding rail connection, a hinged connection, etc., and is configured to open and close the pick-and-place opening. In an illustrated embodiment, the heating device 100 also includes a drawer 140 for carrying the object to be processed; a front end plate of the drawer 140 is configured to be fixedly connected with the door body 120, and two lateral side plates of the drawer are movably connected with the container body 110 by sliding rails.

The power supply module 162 may be configured to be electrically connected with the electromagnetic generating module 161 to provide electric energy to the electromagnetic generating module 161, so that the electromagnetic generating module 161 generates electromagnetic wave signals. The radiating antenna 150 may be disposed in the container body 110 and is electrically connected with the electromagnetic generating module 161 to generate electromagnetic waves of corresponding frequencies according to the electromagnetic wave signals, so as to heat the object to be processed in the container body 110.

When the pick-and-place opening is formed in the front wall of the container body 110, the radiating antenna 150 may be disposed at the top, bottom, two lateral sides or rear of the container body 110. When the pick-and-place opening is formed in the top wall of the container body 110, the radiating antenna 150 may be disposed at the peripheral side or bottom of the container body 110. Preferably, the radiating antenna 150 is disposed at the bottom of the container body 110 to avoid the damage to the antenna due to an excessively high object to be processed in the drawer 140, and the antenna may be hidden by the drawer 140.

Hereinafter, the technical solution of the present invention is described in detail by taking the radiating antenna 150 disposed at the bottom of the container body 110 as an example.

In some embodiments, the container body 110 may be made of metals to serve as a receiving pole to receive electromagnetic waves generated by the radiating antenna 150. In some other embodiments, a receiving pole plate may be disposed on the top wall of the container body 110 to receive electromagnetic waves generated by the radiating antenna 150.

Figure 4:
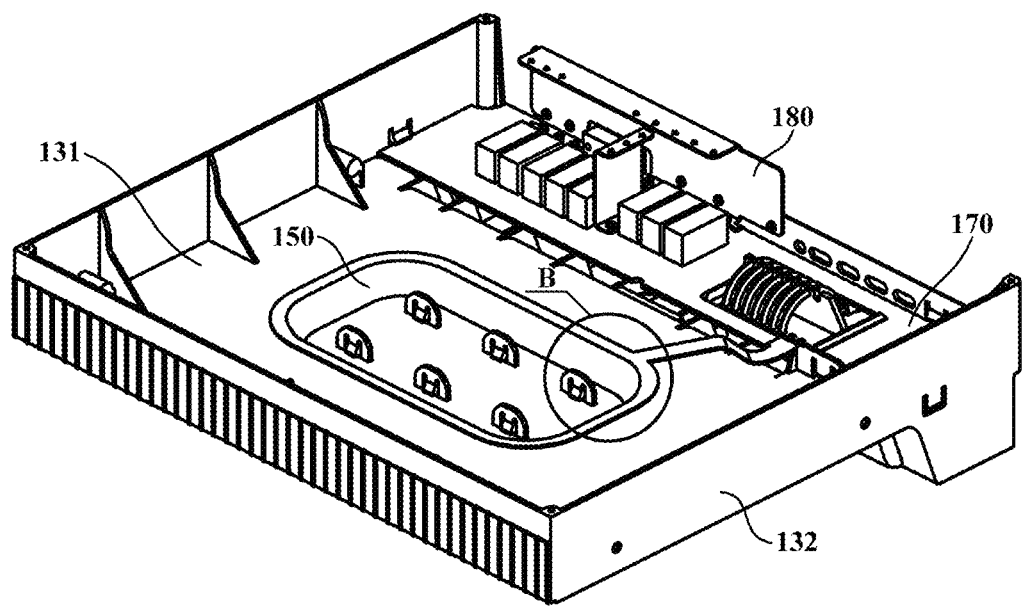
FIG. 4 is a schematic structural view of an electrical appliance chamber according to one embodiment of the present invention.

FIG. 4 is a schematic structural view of an electrical appliance chamber 112 according to one embodiment of the present invention. Referring to FIG. 4, the radiating antenna 150 may be configured to arch upward to relatively reduce the distance between the center of the radiating antenna 150 and the top wall of the container body 110 and increase the distance between the peripheral edge of the radiating antenna 150 and the top wall of the container body 110, thereby eliminating the influence of an edge effect on the distribution uniformity of the electromagnetic waves in the heating chamber 111, and increasing the energy density and distribution range of the electromagnetic waves while improving the distribution uniformity of the electromagnetic waves.

It is well-known to those skilled in the art that the edge effect means that the magnetic field intensity at the peripheral edge of the antenna is much higher than the magnetic field intensity at the center of the antenna.

Specifically, the radiating antenna 150 may include a central part 150a, an edge part 150c and a connecting part 150b for connecting the central part 150a and the edge part 150c. The central part 150a may extend along a horizontal direction. The edge part 150c may be disposed under the central part 150a, and extends parallel to the central part 150a. The connecting part 150b may be configured to divergently extend from the peripheral edge of the central part 150a to the inner peripheral edge of the edge part 150c, so as to further improve the distribution uniformity of the electromagnetic waves in the heating chamber 111.

In some embodiments, the connecting part 150b may include a first arc segment, a straight-line segment and a second arc segment which are sequentially connected from the peripheral edge of the central part 150a to the inner peripheral edge of the edge part 150c, wherein the first arc segment may be configured to be tangent to the central part 150a, the straight-line segment may be configured to be tangent to the first arc segment, and the second arc segment may be configured to be tangent to the straight-line segment and the edge part 150c, so as to avoid the generation of the edge effect at sharp corners, and further improve the distribution uniformity of the electromagnetic waves in the heating chamber 111.

In some embodiments, the geometric centers of the central part 150a, the connecting part 150b and the edge part 150c all coincide with the center of a maximum cross section of the heating chamber 111 taken along an imaginary plane extending horizontally, so as to enable the electromagnetic waves in the heating chamber 111 to be distributed more uniformly.

In some embodiments, the heating chamber 111 may be in a shape of a rectangle. Adaptively, the central part 150a may be in a shape of an oblong, and the length direction of the central part 150a may be parallel to the length direction of the above-mentioned cross section, so that the electromagnetic waves in the heating chamber 111 are distributed more uniformly.

In some embodiments, the length $w_1$ of the central part 150a may be 0.386 to 0.522 (such as 0.386, 0.45 or 0.522) times the length W of the above-mentioned cross section. The width $d_1$ of the central part 150a may be 0.19 to 0.471 (such as 0.19, 0.2, 0.375 or 0.471) times the width D of the above-mentioned cross section. The fillet radius of the central part 150a may be 0.2 to 0.4 (such as 0.2, 0.33 or 0.4) times the width $d_1$ of the central part 150a. The length $w_2$ of the outer end edge of the edge part 150c may be 0.519 to 0.674 (such as 0.519, 0.6 or 0.674) times the length W of the above-mentioned cross section. The width $d_2$ of the outer end edge of the edge part 150c may be 0.38 to 0.62 (such as 0.38, 0.5 or 0.62) times the width D of the above-mentioned cross section. The fillet radius of the outer end edge of the edge part 150c may be 0.2 to 0.4 (such as 0.2, 0.33 or 0.4) times the width $d_2$ of the outer end edge of the edge part 150c. The radius $r_1$ of the first arc segment may be greater than or equal to 1/3 of the spacing $(h_1-h_2)$ between the central part 150a and the edge part 150c in a vertical direction, for example, may be 1/3, 2/5 or 1/2 of the spacing between the central part 150a and the edge part 150c in a vertical direction. An included angle α between the straight-line segment and the central part 150a may be 120° to 160°, such as 120°, 140° or 160°. The radius $r_2$ of the second arc segment may be greater than or equal to 1/6 of the spacing $(h_1-h_2)$ between the central part 150a and the edge part 150c, for example, may be 1/6, 1/5, 1/3 or 1/2 of the spacing between the central part 150a and the edge part 150c in a vertical direction. In the present invention, by limiting each size of the radiating antenna 150 in a horizontal direction, the production cost can be saved, and at the same time, the electromagnetic waves in the heating chamber 111 can have a relatively large distribution area in the horizontal direction.

The central part 150a may be disposed at a height $(h_1/H)$ of 0.285 to 0.5 (such as 0.285, 0.292, 0.33, 0.4 or 0.5) of the container body 110. The edge part 150c may be disposed at a height $(h_2/H)$ of 0.19 to 0.334 (such as 0.19, 0.195, 0.2, 0.25 or 0.334) of the container body 110. In the present invention, by limiting the setting height of the radiating antenna 150 in the vertical direction, the volume of the heating chamber 111 can be relatively large, and at the same time, the electromagnetic waves in the heating chamber 111 can have a relatively high energy density.

In order to further understand the present invention, the preferred implementation solutions of the present invention are described below in conjunction with more specific embodiments.

Figure 8:
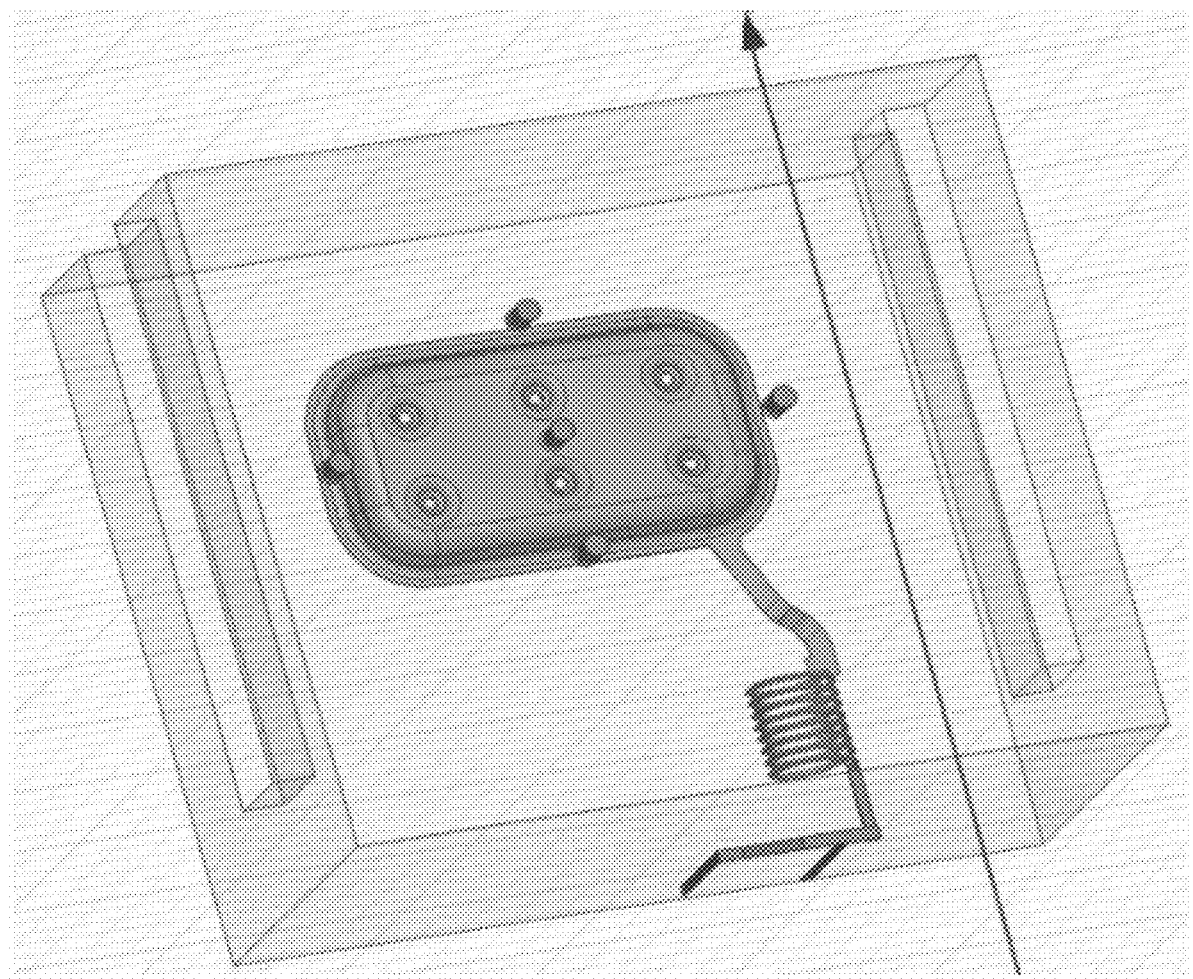
FIG. 8 is a test view of a radiating antenna according to one embodiment of the present invention.

FIG. 8 is a test view of a radiating antenna according to one embodiment of the present invention. Referring to FIG. 8, the radiating antenna is a radiating antenna according to one embodiment of the present invention, and parameters of the radiating antenna are: $w_1$=154 mm, $d_1$=86 mm, $w_2$=205 mm, $d_2$=115 mm, $r_1$=10 mm, α=130°, $r_2$=5 mm, $h_1$=50 mm, $h_2$=34 mm; the fillet radius of the central part 150a is 28 mm; and the fillet radius of the outer end edge of the edge part 150c is 38 mm.

Figure 10:
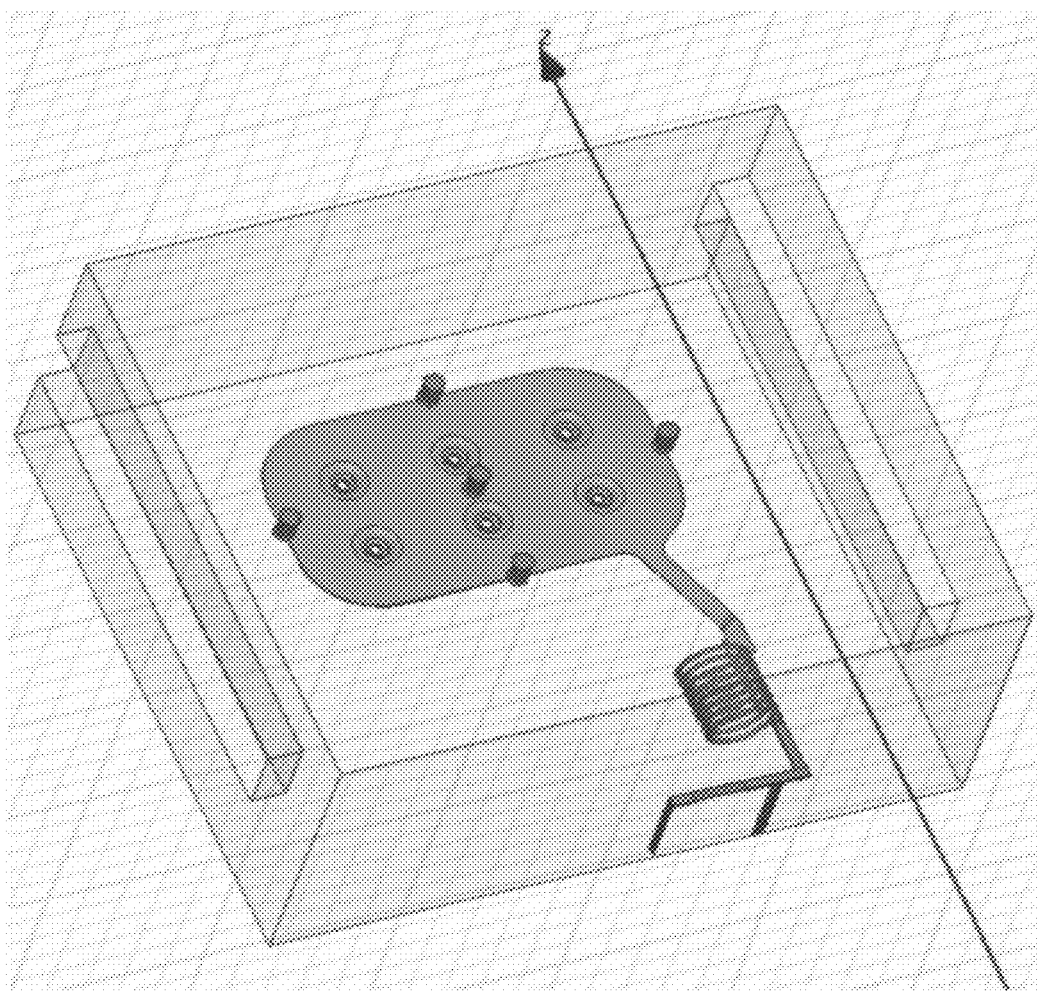
FIG. 10 is a test view of a radiating antenna according to a comparative example of the present invention.

FIG. 10 is a test view of a radiating antenna according to a comparative example of the present invention. Referring to FIG. 8, the radiating antenna is a flat plate antenna, and the antenna is in a shape of an oblong, with a length of 205 mm, a width of 115 mm, a fillet radius of 38 mm, and a distance of 50 mm between the antenna and the bottom wall.

Test specification: the radiating antenna in the embodiment of FIG. 8 and the radiating antenna in the comparative example of FIG. 10 are respectively placed in a container body (W=342 mm, D=230 mm, H=171 mm) for simulation experiments.

Figure 9:
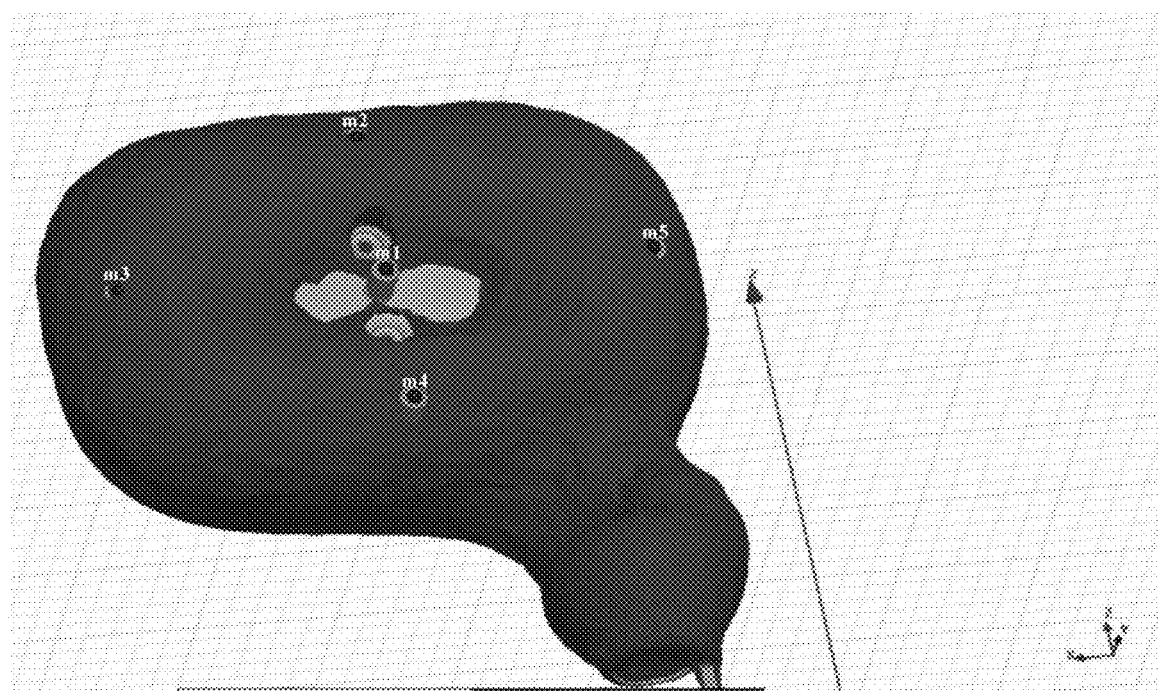
FIG. 9 is a simulated view of distribution of electromagnetic waves measured based on FIG. 8.
Figure 11:
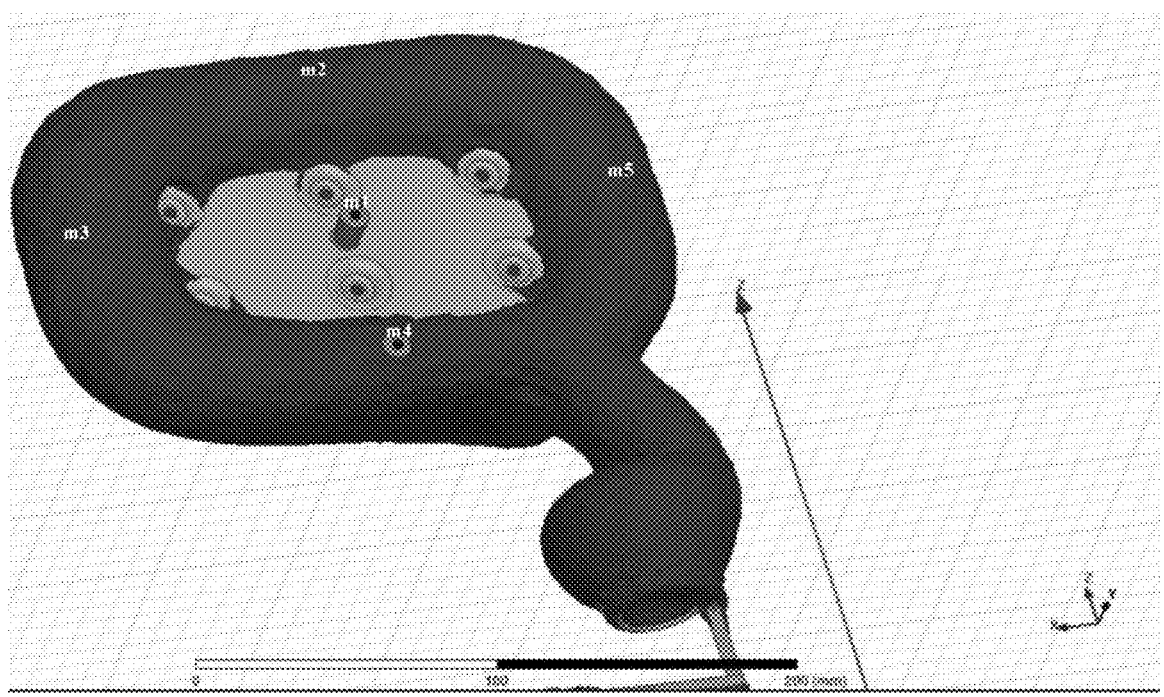
FIG. 11 is a simulated view of distribution of electromagnetic waves measured based on FIG. 10.

FIG. 9 is a simulated view of distribution of electromagnetic waves measured by FIG. 8. FIG. 11 is a simulated view of distribution of electromagnetic waves measured by FIG. 10. In order to clearly compare the distribution difference of the electromagnetic waves between the embodiment and the comparative example, both the simulated view in FIG. 9 and the simulated view in FIG. 11 are set as follows: when the magnetic field intensity at any spatial point in the container body is greater than an intensity value (the intensity value is the difference between the magnetic field intensity at the center of the antenna in the embodiment of FIG. 8 and the magnetic field intensity at the center of the antenna in the comparative example of FIG. 10), the spatial point is shown as having electromagnetic waves.

It can be seen from FIG. 9 and FIG. 11 that compared with the flat plate antenna in the comparative example, the radiating antenna 150 in the embodiment of the present invention has no hidden trouble of magnetic field concentration and has a uniform distribution and a relatively large distribution range of electromagnetic waves.

TABLE 1

Electric field intensity test table a

| Measuring point | X | Y | Z | Electric field intensity |
|---|---|---|---|---|
| m1 | 15.500 | 66.000 | 401.830 | 2.782e+003 |
| m2 | 15.500 | 66.000 | 457.700 | 3.059e+003 |
| m3 | 110.500 | 66.000 | 401.830 | 3.181e+003 |
| m4 | 15.500 | 66.000 | 347.700 | 2.829e+003 |
| m5 | −79.500 | 66.000 | 401.830 | 3.060e+003 |

TABLE 2

Electric field intensity test table b

| Measuring point | X | Y | Z | Electric field intensity |
|---|---|---|---|---|
| m1 | 15.600 | 66.000 | 401.830 | 1.206e+003 |
| m2 | 15.500 | 66.000 | 457.700 | 1.813e+003 |
| m3 | 110.500 | 66.000 | 401.830 | 1.896e+003 |
| m4 | 15.500 | 66.000 | 347.500 | 1.446e+003 |
| m5 | −79.500 | 66.000 | 401.830 | 1.685e+003 |

Table 1 is an electric field intensity test table in FIG. 9. Table 2 is an electric field intensity test table in FIG. 11. It can be seen from Table 1 and Table 2 that the radiating antenna 150 in the embodiment of the present invention has a higher electric field intensity at the same spatial point of the container body than the flat plate antenna in the comparative example, that is, the energy density of the electromagnetic waves at this spatial point is higher, and higher heating efficiency may be obtained.

Referring to FIG. 2 and FIG. 4, the heating device 100 may further include an antenna housing 130 to separate the inner space of the container body 110 into a heating chamber 111 and an electrical appliance chamber 112. The object to be processed and the radiating antenna 150 may be respectively disposed in the heating chamber 111 and the electrical appliance chamber 112 to separate the object to be processed from the radiating antenna 150, so as to prevent the radiating antenna 150 from being dirty or damaged by accidental touch.

In some embodiments, the antenna housing 130 may be made of an insulating material, so that the electromagnetic waves generated by the radiating antenna 150 may pass through the antenna housing 130 to heat the object to be processed. Further, the antenna housing 130 may be made of a non-transparent material to reduce the electromagnetic loss of electromagnetic waves at the antenna housing 130, thereby increasing the heating rate of the object to be processed. The above-mentioned non-transparent material is a translucent material or an opaque material. The non-transparent material may be a PP material, a PC material or an ABS material.

The antenna housing 130 may also be configured to fix the radiating antenna 150 to simplify the assembly process of the heating device 100 and facilitate the positioning and installation of the radiating antenna 150. Specifically, the antenna housing 130 may include a clapboard 131 for separating the heating chamber 111 and the electrical appliance chamber 112, and a skirt part 132 fixedly connected with the inner wall of the container body 110, wherein the central part 150a of the radiating antenna 150 may be configured to be fixedly connected with the clapboard 131.

In some embodiments, the radiating antenna 150 may be configured to be engaged with the antenna housing 130.

Figure 5:
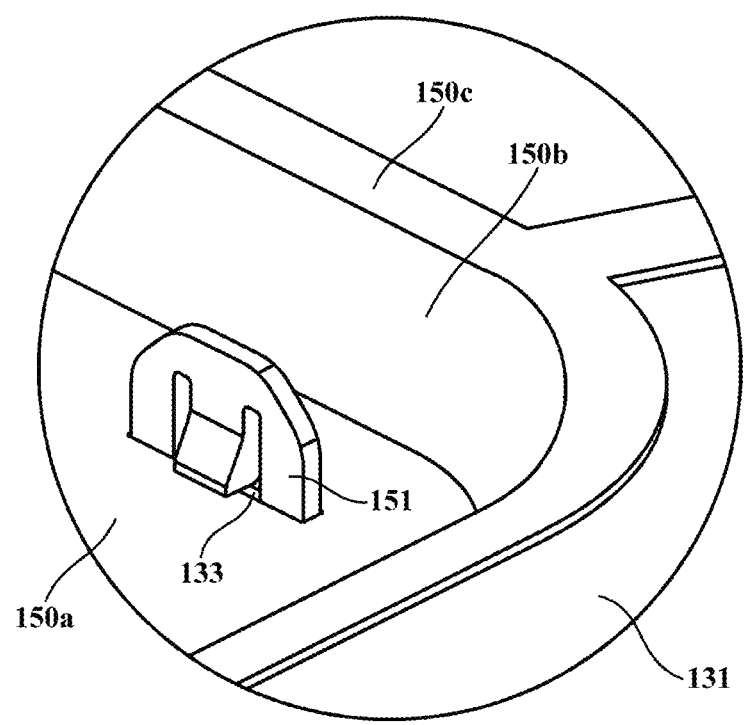
FIG. 5 is a schematic enlarged view of a region B in FIG. 4.
Figure 6:
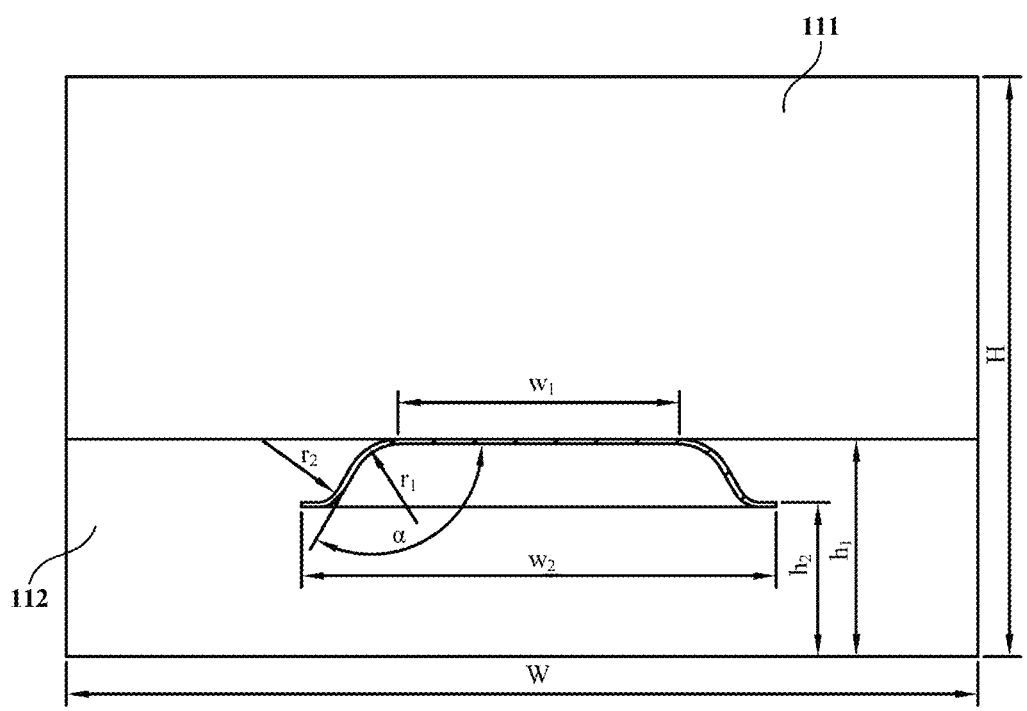
FIG. 6 is a schematic sectional view of a heating device taken along a lateral direction and a vertical direction.
Figure 7:
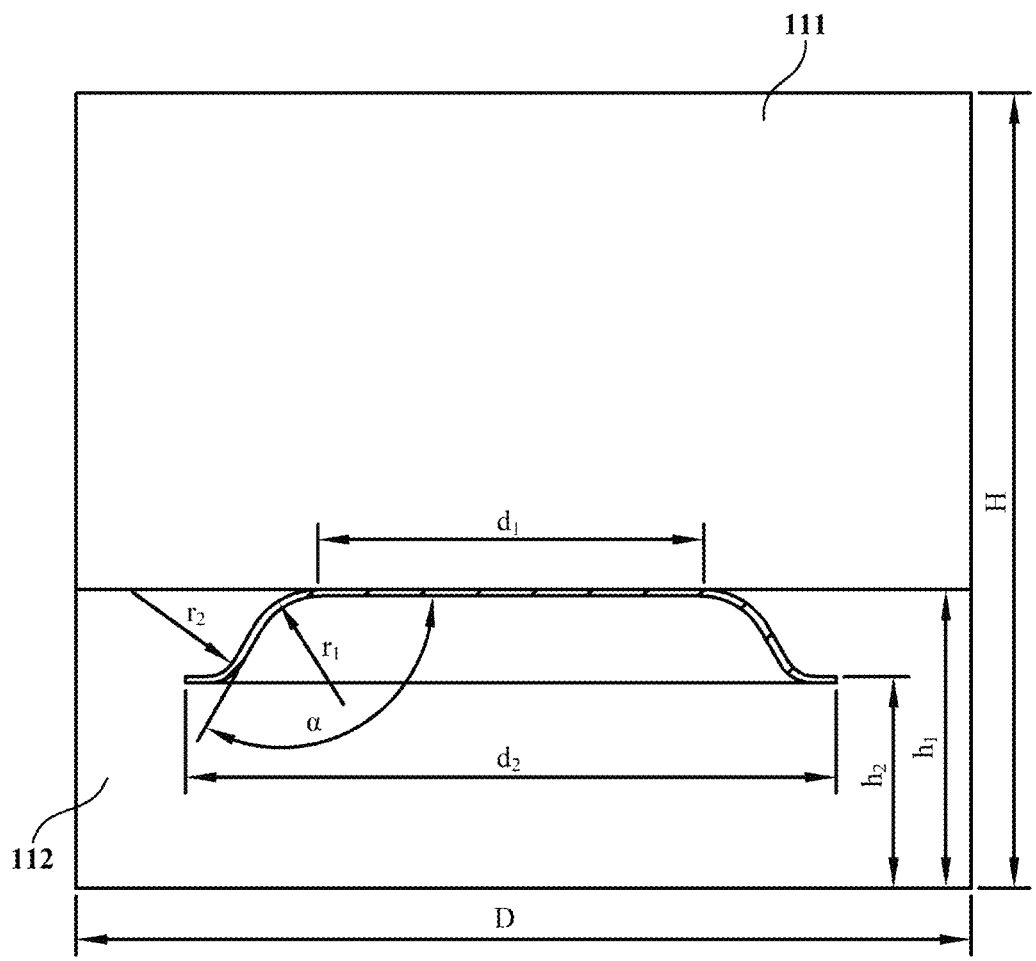
FIG. 7 is a schematic sectional view of a heating device taken along a front-back direction and a vertical direction.

FIG. 5 is a schematic enlarged view of a region B in FIG. 4. Referring to FIG. 5, the radiating antenna 150 may be provided with a plurality of engaging holes 151; the antenna housing 130 may be correspondingly provided with a plurality of buckles 133; and the plurality of buckles 133 are configured to respectively pass through the plurality of engaging holes 151 to be engaged with the radiating antenna 150.

Specifically, each of the buckles 133 may be composed of a fixing part perpendicular to the radiating antenna 150 and having a hollow middle part, and an elastic part extending inclining to the fixing part from the inner end edge of the fixing part and toward the antenna.

The antenna housing 130 may further include a plurality of reinforcing ribs, and the reinforcing ribs are configured to connect the clapboard 131 and the skirt part 132 so as to improve the structural strength of the antenna housing 130.

Figure 3:
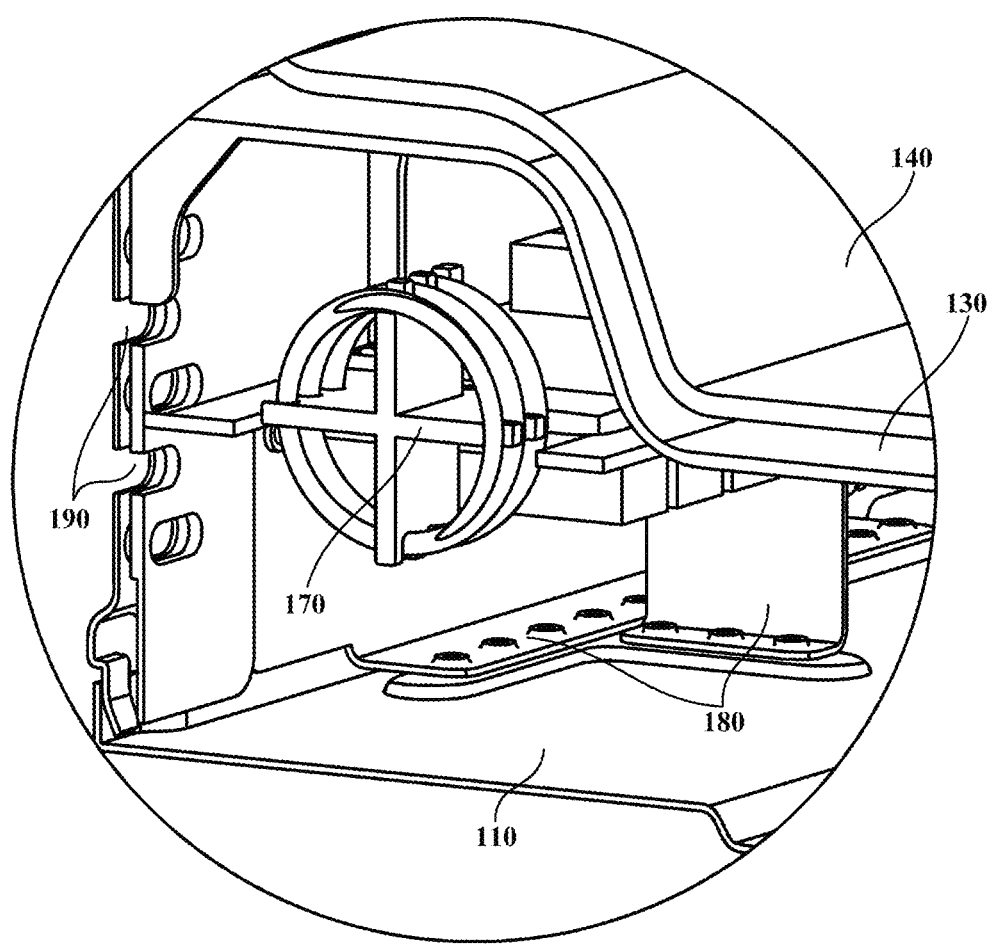
FIG. 3 is a schematic enlarged view of a region A in FIG. 2.

FIG. 3 is a schematic enlarged view of a region A in FIG. 2. Referring to FIG. 1 to FIG. 3, the heating device 100 may further include a signal processing and measurement and control circuit 170. Specifically, the signal processing and measurement and control circuit 170 may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values. Alternatively, the detection unit 171 may be a power meter to directly measure the power of incident waves and reflected waves.

The control unit 172 may further calculate an electromagnetic wave absorption rate of the object to be processed according to the power of incident waves and reflected waves, compare the electromagnetic wave absorption rate with a preset absorption threshold, and send an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

In some embodiments, the heating device 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C., so that the foods have good shear strength. For example, when the object to be processed is raw beef, the preset change threshold may be set to 2.

The control unit 172 may also be configured to receive a user command and control the electromagnetic generating module 161 to start working according to the user command, wherein the control unit 172 is configured to be electrically connected with the power supply module 162 to obtain electric energy from the power supply module 162 and to be always in a standby state.

In some embodiments, the signal processing and measurement and control circuit 170 may be integrated on a circuit board and horizontally disposed in the electrical appliance chamber 112 to facilitate the electrical connection between the radiating antenna 150 and a matching module.

The antenna housing 130 and the container body 110 may be provided with heat dissipation holes 190 respectively in positions corresponding to the matching unit 173, so that the heat generated by the matching unit 173 during working is discharged through the heat dissipation holes 190. In some embodiments, the signal processing and measurement and control circuit 170 may be disposed on the rear side of the radiating antenna 150. The heat dissipation holes 190 may be formed in the rear walls of the antenna housing 130 and the container body 110.

In some embodiments, the metal container body 110 may be configured to be grounded to discharge the electric charges thereon, thereby improving the safety of the heating device 100.

The heating device 100 may further include a metal bracket 180. The metal bracket 180 may be configured to connect the circuit board and the container body 110 to support the circuit board and discharge the electric charges on the circuit board through the container body 110. In some embodiments, the metal bracket 180 may be composed of two parts perpendicular to each other. The metal bracket 180 may be fixedly connected with the circuit board and the container body 110 in advance.

In some embodiments, the electromagnetic generating module 161 and the power supply module 162 may be disposed on the outer side of the container body 110. A part of the metal bracket 180 may be disposed at the rear part of the circuit board and extend vertically along a lateral direction, and may be provided with two wiring ports, so that the wiring terminal of the detection unit 171 (or the matching unit 173) extends out from one wiring port and is electrically connected with the electromagnetic generating module 161, and the wiring terminal of the control unit 172 extends out from the other wiring port and is electrically connected with the electromagnetic generating module 161 and the power supply module 162.

In some embodiments, the container body 110 and the door body 120 may be respectively provided with electromagnetic shielding features, so that the door body 120 is conductively connected with the container body 110 when the door body is in a closed state, so as to prevent electromagnetic leakage.

In some embodiments, the heating device 100 may be disposed in a storage compartment of a refrigerator to facilitate users thawing the food.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:
1. A heating device, comprising:
    a container body, in which a heating chamber having a pick-and-place opening is defined, and the heating chamber is configured to place an object to be processed;
    a door body, disposed at the pick-and-place opening and configured to open and close the pick-and-place opening;
    an electromagnetic generating module, configured to generate an electromagnetic wave signal; and
    a radiating antenna, disposed in the container body and electrically connected with the electromagnetic generating module to generate electromagnetic waves of a corresponding frequency according to the electromagnetic wave signal, wherein the radiating antenna comprises:
        a central part and an edge part, wherein the edge part is disposed on one side of the central part away from the object to be processed and extends parallel to the central part; and
        a connecting part configured to connect the central part and the edge part,
    where the radiating antenna is configured to arch in a direction close to the object to be processed, so as to make a distribution of the electromagnetic waves in the heating chamber more uniform, wherein the connecting part comprises,
        a first arc segment configured to extend from the peripheral edge of the central part to a direction close to the edge part and to be tangent to the central part;
        a straight-line segment configured to be tangent to the first arc segment; and
        a second arc segment configured to connect an outer peripheral edge of the straight-line segment and the inner peripheral edge of the edge part and to be tangent to the straight-line segment and the edge part.
2. The heating device according to claim 1, wherein
    the connecting part is configured to extend divergently from a peripheral edge of the central part to an inner peripheral edge of the edge part along a direction inclined with respect to a plane where the edge part is located.
3. The heating device according to claim 1, wherein
    geometric centers of the central part, the connecting part and the edge part all coincide with a center of a maximum cross section of the heating chamber taken along an imaginary plane parallel to the central part.
4. The heating device according to claim 3, wherein
    the central part is in a shape of an oblong; and
    a length direction of the central part is parallel to a length direction of the cross section.
5. The heating device according to claim 4, wherein
    a length of the central part is 0.386 to 0.522 times a length of the cross section; and/or a width of the central part is 0.19 to 0.471 times a width of the cross section; and/or a fillet radius of the central part is 0.2 to 0.4 times the width of the central part; and/or a length of an outer end edge of the edge part is 0.519 to 0.674 times the length of the cross section; and/or a width of the outer end edge of the edge part is 0.38 to 0.62 times the width of the cross section; and/or a fillet radius of the outer end edge of the edge part is 0.2 to 0.4 times the width of the outer end edge of the edge part; and/or a radius of the first arc segment is greater than or equal to ⅓ of a spacing between the central part and the edge part in a direction perpendicular to the central part;

an included angle between the straight-line segment and the central part is 120° to 160°; and a radius of the second arc segment is greater than or equal to ⅙ of a spacing between the central part and the edge part in a direction perpendicular to the central part.

6. The heating device according to claim 1, wherein the central part extends horizontally;

the central part is disposed at a height of 0.285 to 0.5 times of a height of the container body; and the edge part is disposed at a height of 0.19 to 0.334 times of the height of the container body.

7. The heating device according to claim 1, further comprising:

an antenna housing, made of an insulating material and configured to separate an inner space of the container body into an electrical appliance chamber and the heating chamber, wherein the radiating antenna is disposed in the electrical appliance chamber, and the central part thereof is fixedly connected with the antenna housing.

8. The heating device according to claim 7, wherein the central part is provided with a plurality of engaging holes; and the antenna housing is correspondingly provided with a plurality of buckles, and the plurality of buckles are configured to respectively pass through the plurality of engaging holes to be engaged with the central part, wherein each of the buckles is composed of a fixing part perpendicular to the central part and having a hollow middle part, and an elastic part extending inclining to the fixing part from an inner end edge of the fixing part and toward the central part.

9. The heating device according to claim 5, wherein:

the central part extends horizontally;

the central part is disposed at a height of 0.285 to 0.5 times of a height of the container body; and the edge part is disposed at a height of 0.19 to 0.334 times of the height of the container body.

10. A heating device, comprising:

a container body, in which a heating chamber having a pick-and-place opening is defined, and the heating chamber is configured to place an object to be processed;

a door body, disposed at the pick-and-place opening and configured to open and close the pick-and-place opening;

an electromagnetic generating module, configured to generate an electromagnetic wave signal;

a radiating antenna, disposed in the container body and electrically connected with the electromagnetic generating module to generate electromagnetic waves of a corresponding frequency according to the electromagnetic wave signal, wherein the radiating antenna comprises:

a central part and an edge part, wherein the edge part is disposed on one side of the central part away from the object to be processed and extends parallel to the central part; and a connecting part, configured to connect the central part and the edge part; and an antenna housing, made of an insulating material and configured to separate an inner space of the container body into an electrical appliance chamber and the heating chamber, wherein the radiating antenna is disposed in the electrical appliance chamber, and the central part thereof is fixedly connected with the antenna housing, wherein the radiating antenna is configured to arch in a direction close to the object to be processed, so as to make a distribution of the electromagnetic waves in the heating chamber more uniform, wherein the central part is provided with a plurality of engaging holes; and the antenna housing is correspondingly provided with a plurality of buckles, and the plurality of buckles are configured to respectively pass through the plurality of engaging holes to be engaged with the central part, wherein each of the buckles is composed of a fixing part perpendicular to the central part and having a hollow middle part, and an elastic part extending inclining to the fixing part from an inner end edge of the fixing part and toward the central part.

* * * * *